(12) United States Patent
Salvi Dos Reis

(10) Patent No.: US 6,672,222 B2
(45) Date of Patent: Jan. 6, 2004

(54) ROBOTIC INTERNAL GAUGE WITH CONTACT AT RIGHT ANGLES TO THE OIL PIPELINE

(75) Inventor: Ney Robinson Salvi Dos Reis, Rio de Janeiro (BR)

(73) Assignee: Petroleo Brasileiro S.A., Petrobras (BR)

( * ) Notice: Subject to any disclaimer, the term of this patent is extended or adjusted under 35 U.S.C. 154(b) by 0 days.

(21) Appl. No.: 10/073,361

(22) Filed: Feb. 13, 2002

(65) Prior Publication Data

US 2003/0150351 A1 Aug. 14, 2003

(51) Int. Cl.⁷ .............................................. B61B 13/00
(52) U.S. Cl. .................................................... 104/138.2
(58) Field of Search ........................... 104/138.2, 138.1

(56) References Cited

U.S. PATENT DOCUMENTS

| | | | |
|---|---|---|---|
| 5,018,451 A | * 5/1991 | Hapstack .................. | 104/138.2 |
| 5,080,020 A | * 1/1992 | Negishi ..................... | 104/138.2 |
| 5,293,823 A | * 3/1994 | Box .......................... | 104/138.2 |
| 5,375,530 A | * 12/1994 | Zollinger et al. .......... | 104/138.2 |
| 5,497,707 A | * 3/1996 | Box .......................... | 104/138.2 |
| 5,971,404 A | * 10/1999 | Stoves ...................... | 104/138.2 |
| 6,415,722 B1 | 7/2002 | Reis .......................... | 104/138.2 |
| 6,431,079 B1 | * 8/2002 | Appleton et al. .......... | 104/138.2 |

\* cited by examiner

Primary Examiner—S. Joseph Morano
Assistant Examiner—Lars A. Olson
(74) Attorney, Agent, or Firm—Nixon & Vanderhye PC

(57) ABSTRACT

Robotic, preferably cylindrical equipment having the capacity to move within a pipeline or other confined space in both directions and to carry out miscellaneous operations, pulling along an umbilical and carrying accessories, tools, or materials. It includes two identical modules joined by a rotary joint connecting the pistons of hydraulic or pneumatic propulsive piston systems. Each module includes a propulsive piston system which is responsible for the longitudinal movement of module, a positioning tower on which are mounted wheels having a non-reversing system and means for rotating positioning tower through one hundred and eighty degrees with reference to its vertical axis, reversing the direction of movement of equipment. Through the development or attachment of interfaces it is possible to bring tools, equipment, devices or materials to a remote location within a pipeline having bends within the limits of the standards for clearing obstructions, making inspections and other operations.

16 Claims, 7 Drawing Sheets

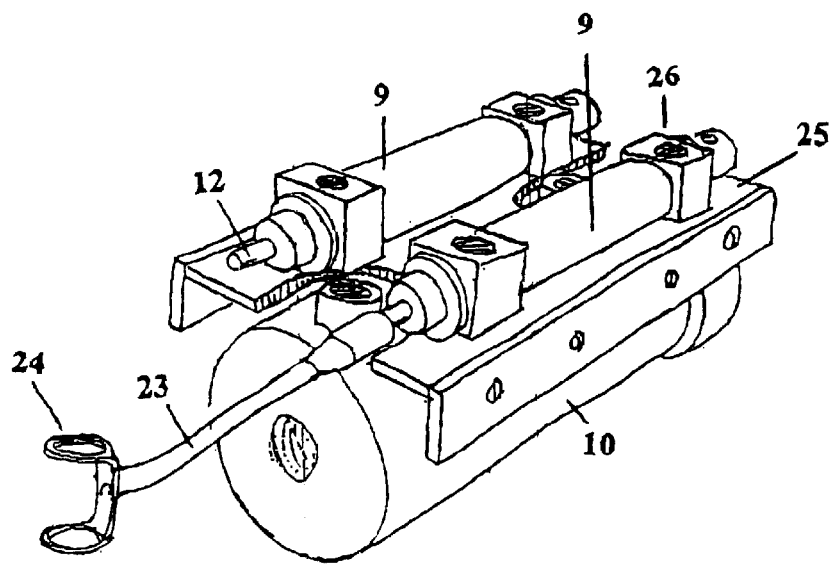
FIGURE 3
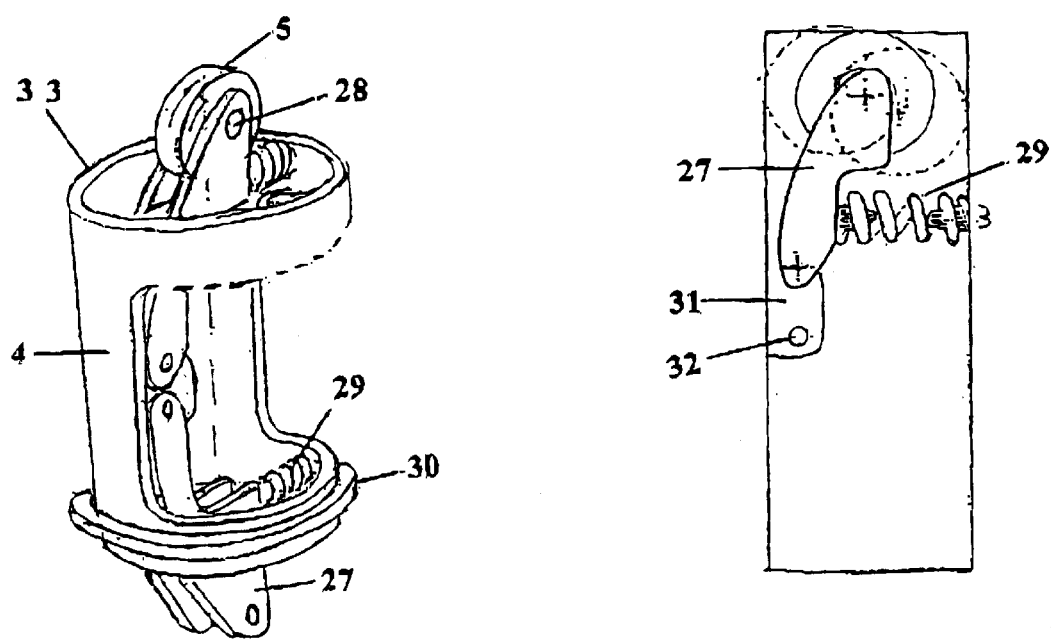
FIGURE 4
FIGURE 5

ROBOTIC INTERNAL GAUGE WITH CONTACT AT RIGHT ANGLES TO THE OIL PIPELINE

FIELD OF THE INVENTION

The invention comprises robotic equipment for carrying out operations in pipelines which can be applied to the activities of the production and transport of petroleum and its derivatives. More specifically, it relates to a vehicle capable of introducing tools, equipment or materials within pipelines, especially when long and installed under conditions of difficult access, for the purposes of removing obstructions, making inspections, repairs and other work. Although designed for use in the work of the production of petroleum and derivatives, the invention can be applied to any other industrial areas which make use of pipelines, or other confined spaces which may need work to be done within them, such as for example systems for the distribution of water, gas, basic drainage, hospital systems, air ducts, etc., energy generating plants, refineries, plants involving classified industrial processes (nuclear plants, etc.), plants for miscellaneous industrial processes, etc.

BASIS OF THE INVENTION

With the development of new technologies, the offshore production of petroleum is becoming viable at increasingly greater depths. This scenario involves the need to install an extensive system of pipelines at considerable depths. Together with other technological challenges which are being overcome, mainly those relating to the increasingly exacting specifications for equipment because of the high pressures, it is common for problems of various kinds which have not always been foreseen in advance to occur. Of these, mention may be made, for example, of problems brought about by low temperatures, which are normally associated with the properties of the fluid transported.

In the case of the problems arising as a result of low temperatures, there has been observed a tendency for reduction in the fluidity of oil, the formation of hydrates, the deposition of paraffin and, frequently, the occurrence of severe restrictions in flow or even blockages in pipelines. Clogging, which can also be caused by the deposition of sand or other materials, sometimes occurs at long distances from the nearest access points. In this way it is difficult or even impossible using the technology currently available to bring tools, equipment or other materials up to them. In work within pipelines, whether submarine or not, a prior survey of the conditions of the system is to be recommended, including at least:

- survey of the layout of the pipelines to detect any differences between design and construction,
- determination of the type of protection present in the pipeline (mechanical, chemical, cathodic, etc.),
- investigation of the historical record of operational problems (occurrences), age of the installation, length and conditions of use, etc.,
- an examination of routine inspection reports, among other technical documents.

One of the most important factors which has to be considered is the dimensional factor. Nominal diameter, bends, connections, branches, ovalization, dents, imperfections in the pipeline wall, etc., will interfere directly with the choice and performance of the system used to carry out work. Recently, much has been invested in the development of multidimensional pigs and techniques based on collapsing the pipelines, with a view to dealing with the dimensional aspects mentioned above which very often literally consist of accidents along the route. Some of these aspects, like bends and branches, may be known from the design and/or field surveys. It is common for pipelines to have sharp bends, and these significantly restrict the means available for work. At the present time the API standards accept a minimum radius of curvature of three times the nominal diameter for a particular gauge. Where the interruption in flow is total, the so-called hydraulic "wedge" is needed, which makes it impossible to use the main tool available for clearing long pipelines, which is a pig. Use of the latter equipment presupposes the existence of flow and a pressure difference within the pipeline. If a submarine pipeline breaks, the fluid tends to flow out into the external environment until a situation of pressure equilibrium is obtained. In this situation the pipeline has high operational instability as its main characteristic. Any attempt at action which involves a change in pressure will disrupt this precarious equilibrium and cause more spillage. The need to empty the pipeline, so that the causes of the accident can be investigated more closely and better known, must without fail go through a set of safety measures. At the present time, for fluid to be withdrawn from within the pipeline, it is necessary to use pumping, and this makes drainage unavoidable. As a protective measure temporary pipes are fitted and tested for leaks.

In both the situation where flow is totally obstructed and in the situation where pipelines are broken it is desirable that equipment should be developed which is capable of carrying some equipment inside the pipeline to the site of the problem without the need for a pressure difference. In the case of a broken pipeline, for example, the possibility of reaching the region of the failure from within the pipe with something which has yet to be developed which would make it possible to seal it and make use of the pumping pressure acting in a favourable direction, outwards from the interior, making the sealing means adhere even more, would constitute an innovative method for dealing with this type of problem. This accessory is already under development as one of the items which might carry out emergency repairs. This invention is designed to overcome problems such as those mentioned above, among others. It may act as a tool carrier, travelling within a pipeline, within specific diameter ranges, and having bends within the normal limits. It may also be used for surveying the profile of the internal surface of a pipeline, acting as a gauge. To sum up, the invention may be used for inspections and various types of work at points which are inaccessible for the means available at this time. Its movement within pipelines, in both directions, is based on the control of friction and on the use of non-reversing wheels mounted on towers capable of rotating about their vertical axis under remote control.

STATE OF THE ART

At the present time, equipment known as a pig is used for the work of removing encrustations in pipelines for the transport of petroleum. This comprises an object of round or oval shape, generally manufactured from some polymer, which moves along a length of the pipeline. While travelling, the pig scrapes off encrustations from the internal surface of the pipeline which partly obstruct it. The launcher is installed at the start point and the so-called pig-catcher is installed at the other end.

However, in order to move, the pig requires a pressure difference between the two ends of the length of the pipeline and the presence of a flow of fluid. When there is total obstruction of the pipeline there is no pressure difference, the fluid does not circulate, and a form of hydraulic plug is formed, and as a consequence pigs cannot be used. When there is a total blockage of flow a possible alternative to a pig is a flexitube. This is a flexible tube which has some strength and is provided with means for being passed inside the pipeline, which is used for various types of work. However, the scope of this equipment is limited. If the blockage point is at a distance, it may not even be possible to reach it. Although having considerable strength, the flexitube has limited capacity for application of the force which it requires in order to be pushed into the pipeline without suffering bending or excessive deformation. Mainly because of friction, there is a tendency for the flexitube to form a helicoid supported against the internal surface of the pipeline. As the flexitube moves forward, friction increases considerably, and more and more force is needed to push it into the pipeline. Formation of the helicoid and a consequent spring effect is thus accentuated. Beyond a certain point this prevents the front of the flexitube from advancing, because of the limitations of the material of the flexitube itself or the equipment pushing it, limiting the scope of its action. At the present time it is possible to reach a distance of the order of one and a half kilometres using this type of equipment. Thus, if the location of the obstruction is at a greater distance, which is quite common in an extensive pipeline system, the flexitube cannot be used. As part of the programme of technological development known as Deepstar, the Radoil Tool Co., in association with Ambar Production Services, has developed a type of pulling mechanism, together with small trucks, for use with flexitubes in order to assist their movement within pipelines. It has, however, been found that the scope of this system is limited and that it needs further development to meet the operational needs resulting from maintenance work in an extensive system of pipelines.

Another alternative, when the flow is totally blocked, is the equipment known commercially as the Well Tractor, manufactured by the company Welltec. This equipment is able to move within pipelines and can be used for particular types of work. However, the Well Tractor was designed for use in wells, and its excessive length and limited scope make it unsuitable for some types of routes and distances frequently found in petroleum pipeline systems. Brazilian application PI 9904364-5, Remote-Controlled Vehicle for Work within Pipelines, of Sep. 28, 1999, by the Applicant, relates to equipment having the ability to move within pipelines, which can be used in cases of complete obstruction occurring at great distances from the access point, and for other types of operational problems, needs or emergencies. The great advantage of this equipment over a conventional pig, in terms of design, is that it is possible to transport tools to the requisite region independently of any flow. The equipment is unaffected by a natural hydraulic block brought about by total blockage of the pipeline. However, the vehicle to which application PI 9904364-5 relates was not developed for operations in pipelines with sharp bends. A pipeline system normally incorporates bends of up to three times the nominal diameter of the pipe, which acts as an impediment to the full use of this equipment.

To overcome this problem, this invention provides an improved design of this type of equipment, which comprises two identical modules symmetrically coupled by means of a type of joint which makes it better able to take up marked misalignments in route. Another advantage of the design of the equipment according to this invention is simplification of the traction system which is responsible for movement of the assembly along the pipeline. Comparing this invention with the vehicle to which application PI 9904364-5 relates, it will be seen that the latter comprises a single block and that the set of supporting fins therein has been improved and has changed from three sets of three fins to two sets of two wheels. These differences offer different applications for the invention in comparison with PI 9904364-5. It is indicated for pipelines having bends up to the maximum limit in the standards and preferably for light loads. The vehicle to which PI 9904364-5 relates is on the contrary indicated for heavier loads and for predominantly straight pipelines, or with only long-radius bends or small misalignments. Acting as a tool carrier, the invention can position, move, fit or operate, jointly with other equipment, for example:

non-destructive inspection and testing systems such as ultrasound or X-ray heads, chemical jetting systems, nitrogen generation systems (NGS), image capture and transfer systems, signalling systems (audible, magnetic, etc.), systems for surveying the profile of the internal surface of a pipeline.

Another feature of the invention, which operationally is very attractive, is its ability to move in two directions: in an upstream direction and in a downstream direction. The system for reversing the direction of movement, which takes place under remote control, is mounted on board the equipment and can be provided in various ways. In the preferred embodiment described herein the direction of movement is reversed by rotating the tower supporting the wheels by one hundred and eighty degrees about its vertical axis. As a result of this rotation, the non-reversing direction of these wheels is reversed. Rotation of the supporting tower is brought about, in the embodiment in this description, by means of a system of suitably positioned and dimensioned lever arms which are hydraulically activated. There are other possibilities such as, for example, the use of an electrical activator. Replacement of the fins by wheels with a non-reversing system solves the problem of wear on the fins supporting the vehicle to which application PI 9904364-5 relates, which are constantly in contact with the wall of the pipeline when in use. In this invention this contact is made through the wheels. When subjected to stress as a result of friction on the internal surface of the wall, the non-reversing system behaves in two ways:

in one direction it rotates freely, permitting movement of the corresponding module, in the other it brakes, causing the module to be anchored.

The wheels may be provided with additional devices such as, for example, position detectors and odometers, so that as it moves along the pipeline the equipment automatically produces a profile of the internal surface of the pipeline at a remote console. The equipment according to the invention may be fitted with accessories and the means necessary for operations and the transport of various materials, devices and equipment. Mention must be made of the possibility of carrying out difficult and complex fishing operations, which are so frequent in the work of petroleum production. The rescue of items which have fallen into confined spaces, with continuous monitoring, may also be considered.

SUMMARY OF THE INVENTION

This relates to robotic equipment having the ability to move and carry out various operations, drawing along an umbilical and carrying accessories, tools or materials within a pipeline or other confined space, which are preferably cylindrical. It comprises two identical modules joined by a flexible joint which connects the shafts of hydraulic piston systems propelling the modules. Each module basically comprises a main hydraulic piston system which is responsible for movement of the module, a positioning tower on which two wheels, provided with a non-reversing system, are fitted in symmetrical positions in relation to the longitudinal axis of the equipment and means, for example two hydraulic piston systems, for rotating the positioning tower through one hundred and eighty degrees about its vertical axis. As a result of this rotation, the direction of movement of the equipment in the pipeline or confined volume is reversed. Although hydraulic equipment has been described, other forms of power may be provided, both for movement of the equipment and for rotation of the wheel positioning towers. An umbilical is generally connected to the back of the rear module. Through the development or coupling of interfaces the invention makes it possible to position tools, equipment or materials at a remote point within a pipeline having bends within the limits of the standards, in order to clear obstructions, perform inspections or other operations.

BRIEF DESCRIPTION OF THE DRAWINGS

FIG. 3 shows a three-dimensional view of the set of hydraulic cylinders in each module of the equipment.

FIG. 4 shows a partial cross section through a positioning tower in three-dimensional view, in which part of its internal components can be seen.

FIG. 5 shows, diagrammatically, the region of the reverse-preventing means (wheel).

DETAILED DESCRIPTION OF THE INVENTION

For a better understanding of the invention, the latter will be described with reference to the figures accompanying this description. It must however be pointed out that the figures only illustrate a preferred embodiment of the invention, and are not therefore of a restrictive nature. In accordance with the inventive concept described below the possibility of varying the number of positioning heads, the number of (non-reversing) wheels, the manner in which the positioning towers are activated (type of actuator, connections, etc.), variations in the type of connection and supports, the shape of parts and the inclusion of additional devices will be clear to those skilled in the art, and fall within the scope of the invention. Only the main assemblies and parts will be described, omitting details such as seals, pins, connections, plugs, sleeves, pipes, openings, etc. The invention is illustrated by FIGS. 1 to 13 inclusive.

Figure 1:
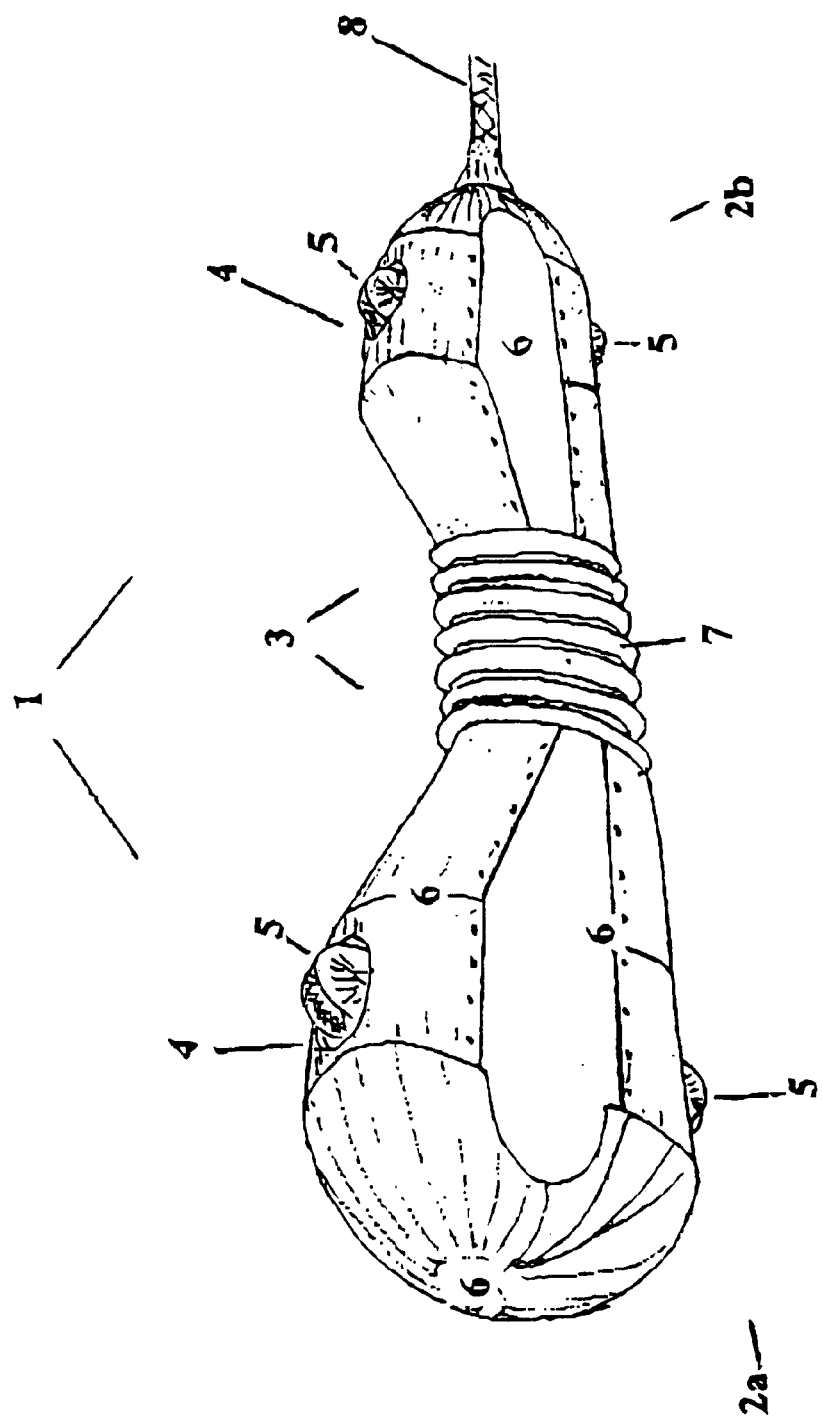
FIG. 1 shows a three-dimensional view of an embodiment of the invention in which its principal parts can be seen.

FIG. 1 shows a three-dimensional diagrammatical and simplified view of a preferred embodiment of the invention. The equipment (1), or robotic vehicle, comprises two identical modules (2a, 2b), symmetrically linked by means of a flexible joint (3). The supporting wheels (5), provided with a nonreversing system, mounted in opposite positions with reference to the longitudinal axis of the equipment (1) on positioning towers (4) can be seen in that figure. These towers (4) have an actuating system which causes them to rotate one hundred and eighty degrees about their corresponding vertical axis. This, preferably hydraulic, system can however be pneumatic, electrical or of another nature. An umbilical (8) is connected to the rear module (2b). The junction (3) between the modules (2a, 2b) has externally a type of cap (7), basically comprising a spring, of for example the helicoidal type, surrounded by a protective cap manufactured from a material having favourable mechanical, chemical and thermal properties. The said cap (7), which must be capable of taking up the cyclical changes in distance between modules (2a, 2b), is also designed to keep the two in line by means of the corresponding spring and to protect a flexible joint and internal hydraulic pipes which feed the two modules (2a, 2b). The two modules have a shell (6). A number of important features relating to the design of the invention will be seen from FIG. 1 together with the above description. Being formed of two modules (2a, 2b), the equipment (1) has significantly improved flexibility and the ability to pass through bends of small radius, over a given total length, than equipment comprising a single block of the same length. The supporting system, based on wheels (5) fitted with a non-reversing system, two per module, is very simple, durable and has little need for maintenance. Wheels (5), mounted on towers (4) which are capable of rotating about their vertical axis, can have their non-reversing directions reversed and as a consequence, as will be described below, the direction of movement of equipment (1) is reversed. Towers (4) may be rotated in various ways, relatively simply. The system for activating and supporting equipment (1), working in both directions, effectively prevents the latter (1) from becoming jammed within the pipeline. Flexible joint (3) between modules (2a, 2b), based on means having elasticity, tends to keep modules (2a, 2b) in line, improving the conditions under which equipment (1) moves. Although not shown in the figure, the front module for example has means for fitting interfaces for operations of various kinds such as inspection, the clearance of obstructions, scraping, filming, etc.

Figure 2:
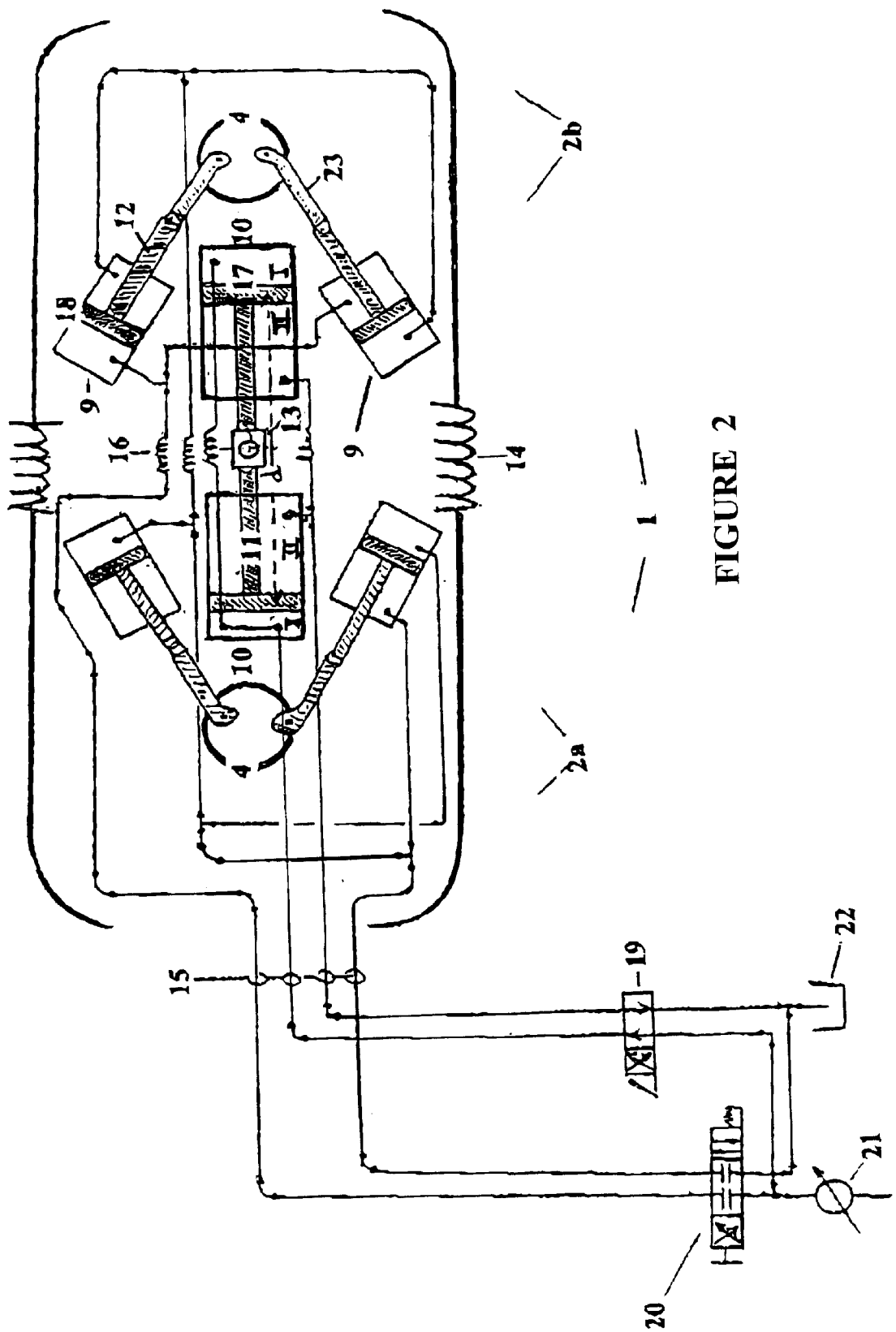
FIG. 2 shows diagrammatically and in simplified form the main internal components of the invention, with emphasis on the hydraulic system and the interconnections.

FIG. 2 shows the main components of the invention in a diagrammatical and simplified (longitudinal) horizontal cross section. The two modules (2a, 2b), which are virtually identical, mounted symmetrically with respect to the transverse axis of the equipment (1), can be seen. Each module (2a, 2b) comprises a positioning tower (4), two piston systems (9) for activating the corresponding positioning tower (4), in the preferred embodiment being described and one piston system (10) comprising the system for moving module (2a, 2b) and as a consequence equipment (1). It will be seen that the shafts (11) of the piston systems (10) moving each module (2a, 2b) are connected by means of a flexible joint (13) for example of the universal type. This being the case, although the distance d between the pistons (17) of the two piston systems (10) moving equipment (1) is constant (approximately equal to the sum of the lengths of the corresponding shafts) when equipment (1) in line, there is no impediment to equipment (1) taking up misalignments in route, in either altitude or direction.

Equipment (1) is moved as described below. The moving piston systems (10) are incorporated in the corresponding modules (2a, 2b) and the latter are supported against the inside surface of the pipeline by means of wheels (5) fitted with a non-reversing system. For simplicity, in this description wheels (5) are also referred to as non-reversing wheels (5). In this way modules (2a, 2b) are only free to move in one direction, either to the right or to the left (forwards or backwards), depending upon the direction in which the non-reversing wheels (5) are positioned. From FIG. 2 it will be seen that equipment (1) must move to the right. For this the non-reversing wheels will be positioned in such a way that they will only permit modules (2a, 2b) to move to the right, opposing any tendency in the latter to move to the left. For greater clarity the module (or piston system) on the left will be called the rear one and the module (or piston system) on the right the front one.

Within the corresponding piston systems (10), pistons (17) define four chambers in corresponding pairs. Thus in each piston system two complementary chambers indicated by the symbols I and II in FIG. 2 are defined. Chambers I comprise the region of the rear piston system to the left of the corresponding piston (17) and the region of the front piston system to the right of corresponding piston (17). Chambers II comprise the region of the rear piston system to the right of corresponding piston (17) and the region of the front piston system to the left of corresponding piston (17). In the course of one pressurisation cycle (chambers I of the front and rear piston systems in the first stage and then chambers II of the front and rear piston systems), the shells of the propulsive piston systems (10) and consequently corresponding modules (2a, 2b) will tend to approach and move away from each other alternately and as a final result will bring about movement of equipment (1) as a whole. Thus, assuming that initially pistons (17) are in an intermediate position, with all chambers I and II having virtually the same volume:

fluid is injected into chambers I; as the sum of the lengths of shafts (11) is constant, d, and the pressures in chambers I are approximately equal, the rear cylinder will tend to move the left, being prevented by the non-reversing means. In this way piston (17) of the rear piston system moves to the right but the body of the cylinder and consequently corresponding module (2a) remains stationary. The front piston system tends to move to the right and thus moves, as it is not prevented by the non-reversing means. As the rear cylinder (module) is stationary and the front one moves forwards, the two modules move away from each other; chambers I reach their maximum size and chambers II their minimum size;

fluid is then injected into chambers II, causing discharge from chambers I; rear (cylinder) module (2a) tends to move to the right and is now not prevented by the action of the non-reversing means; the body of the cylinder therefore moves to the right as corresponding chamber II is filled; the front cylinder (module) tends to move to the left, being prevented by the action of the non-reversing system; as front module (2b) remains stationary and the rear module (2a) moves to the right, the modules move closer together; at the end of this step chambers II are of maximum size and chambers I are of minimum size.

These two stages are then repeated. It will be seen that at the end of one complete cycle (two stages), equipment (1) as a whole will move forward one step. In the first stage front module (2b) advances one step to the right and rear module (2a) is stationary; in the second stage rear module (2a) advances one step to the right while front module (2b) is stationary; the final result of these two stages is that equipment (1) as a whole advances one step to the right in each pressurisation cycle. The direction of movement of equipment (1) is reversed by rotating positioning towers (4) through one hundred and eighty degrees. The two towers (4) are rotated simultaneously, so that the directions of non-reversing systems (5) are reversed simultaneously, thus reversing the movement of modules (2a, 2b) in each stage with reference to the operating cycle described above, and as a final result the direction of movement of equipment (1) is reversed. The number of wheels (5) in each module (2a, 2b) may change, and not all must necessarily have non-reversing means.

In a preferred embodiment of what has been described, towers (4) are activated by hydraulic piston systems (9), two for each tower (4). The said piston systems (9) are connected to towers (4) by means of their shanks (12) which operate levers (23) provided with means (24) for connection at the ends (see FIG. 3). These levers, having specially calculated angles, are suitably positioned and subjected to synchronous movement so as to bring about the rotation of towers (4) about their vertical axis. It is clear that the activation described can be modified using other types of actuators, for example electric or pneumatic actuators instead of hydraulic actuators, as previously pointed out. In order to vary the relative position between modules (2a, 2b) these are connected by flexible means (rotary joint (13), cap (7) and spring (14), for example), and fluid ducts (16) must be constructed in a layout providing the necessary flexibility or elasticity. FIG. 2 also shows diagrammatically views of the hydraulic pipes (15), or pipes for other fluid for piston systems (9, 10); flexible pipes (16) in the region between the modules (2a, 2b), the helicoidal spring (14) of cap (7); flexible joint (13) between shafts (11) of piston systems (10) moving equipment (1); the body of a valve (12) controlling the movement of equipment (1); a valve (20) reversing the direction of movement of equipment (1); a stop valve (21) and a container (22) for hydraulic fluid, if this is the fluid chosen.

FIG. 3 shows a three-dimensional view of a preferred embodiment of the set of hydraulic piston systems for each module (2a, 2b). The three piston systems (9, 9, 10) are mounted in line by means of a supporting and connecting plate (25) forming a rigid assembly which forms part of the structure of module (2a, 2b). Said supporting plate (25) is positioned beneath piston system (10) which moves equipment (1). The piston systems (9) activating tower (4) are mounted for example by means of fixing blocks (26) on supporting plate (25). The shaft (12) of piston system (9) actuating positioning tower (4) is connected to lever (23) activating tower (4), which in turn has means, for example a type of fork (24), for connection to positioning tower (4).

FIG. 4 shows a three-dimensional view of a positioning tower (4), illustrating part of its internal components in diagrammatical cross section. Tower (4) is of predominantly cylindrical shape. Nonreversing means (5) are mounted on tower (4) by means of a transverse axis (28) in a kind of bearing (27). This bearing (27), comprising two flat elongated pieces forming a type of fork, as can also be seen in FIG. 5, has one cantilevered end connected to wheel (5) and the other connected by a shaft (32) to a projection (31), for example, positioned on the inside surface of the cylindrical body (33) of tower (4). Bearing (27) is held in an operating position by supporting itself on elastic means (29). Said means (29) prevent the cantilever end of bearing (27) from rotating downwards at the same time as it forces wheel (5) against the internal surface of the pipeline and in turn bears against the inside surface of the body (33) of tower (4). Thus bearing (27) can rotate through a certain angle about shaft (32) which secures it to the wall of tower (4). This rotational movement is restricted by elastic means (29) and allows wheel (5) to take up any eccentricities and imperfections in the internal surface of the pipeline. Elastic means (29) has means for adjusting the pressure and as a consequence the friction force of wheel (5) against the internal surface of the pipeline.

FIG. 5 shows the activation region of nonreversing means (5) which depends upon the manner in which the latter is attached (bearing (27, elastic means (29), position of projection (31), etc.). On its outside surface tower (4) has for example a kind of skirt (30) for supporting it on its support/bearing (41), which is illustrated in FIG. 8, allowing the latter (4) to rotate about its vertical axis.

Figure 6:
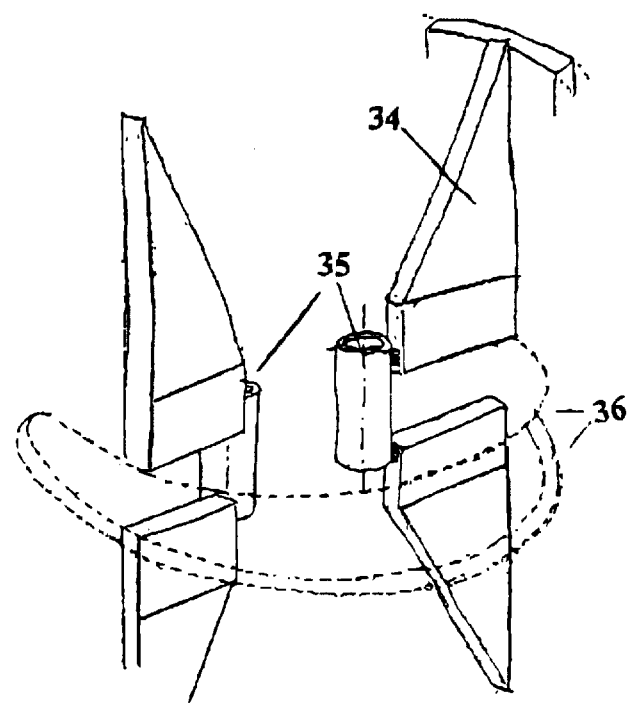
FIG. 6 shows in perspective some internal details of the positioning tower, in particular the bearing for the tower rotation system.

FIG. 6 shows in simplified three-dimensional view some internal elements of positioning tower (4) which form part of its activating (rotation) system. The side surface of tower (4), and other internal components have been omitted for greater clarity to display the components which will be described. Within the body of tower (4) are mounted two bearings (35), to which are connected the forks (24) of levers (23) rotating positioning tower (4). The said bearings (35) may for example be mounted supported on fins (34) which in turn bear against the internal surface of positioning tower (4). Fins (34) are preferably flat, of a predominantly right trapezoidal shape, mounted for example in the same vertical plane as passes through bearings (35). These are preferably top mounted, radially, with the largest base against the internal surface of tower (4) and the predominantly straight edges facing the interior of tower (4) with the smaller bases acting as a support for bearings (35). The said fins (34) are identical and positioned symmetrically in pairs in relation to a transverse plane which passes through the mid point of bearings (35), forming a support assembly. The two assemblies are mounted on the internal surface of tower (4) at the same height, in diametrically opposite positions. In each assembly an empty space may be left between the upper and lower fin and together with an opening (36) in the side surface of tower (4) are provided to permit activating levers (23) to pass and move. Said opening (36) in the side surface of tower (4) is in the shape of a predominantly horizontal and elliptical gash reaching laterally approximately three quarters of the way around the circumference of tower (4). Each set of fins (34) supports a bearing (35).

Figure 7:
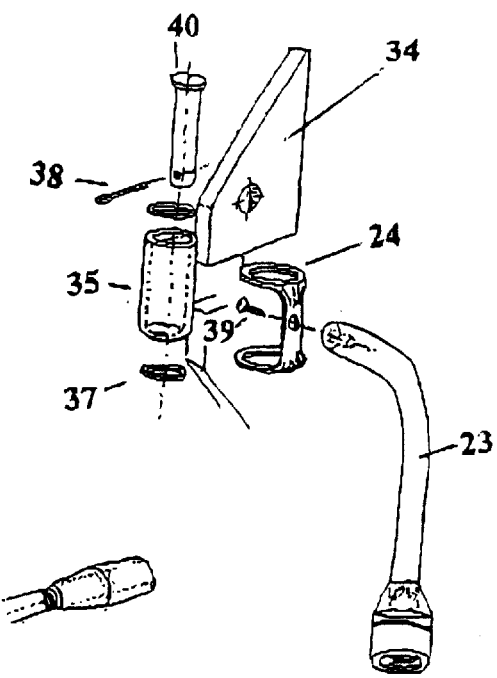
FIG. 7 shows 3-dimensional views in which the relative positions of the main parts of the tower rotation system can be seen.

FIG. 7 shows an exploded three-dimensional view of the main components described in FIGS. 3 and 6, with reference to the system activating positioning tower (4), maintaining their relative positions. One of the two ends of lever (23) activating positioning tower (4) is connected to the end of shaft (12) of corresponding hydraulic piston system (9). The other is connected, for example by means of a bolt (39), to a fork (24) interconnecting with corresponding bearing (35). Bearing (35) is mounted and supported on fins (34) and the fork (24) of lever (23) activating tower (4) is connected to it by means of a pin (40), fitting rings (37) and lock (38), for example. Through this assembly, longitudinal movement of shaft (12) of piston system (9) positioning tower (4) is transmitted to fins (34) which are of one piece with tower (4). As the systems described above are two, connected at two separate points along a diametral line of the right cross section of tower (4), a lever arm is formed transforming the straight line movement of shafts (12) of piston systems (9) into a torque which results in rotation of tower (4).

Figure 8:
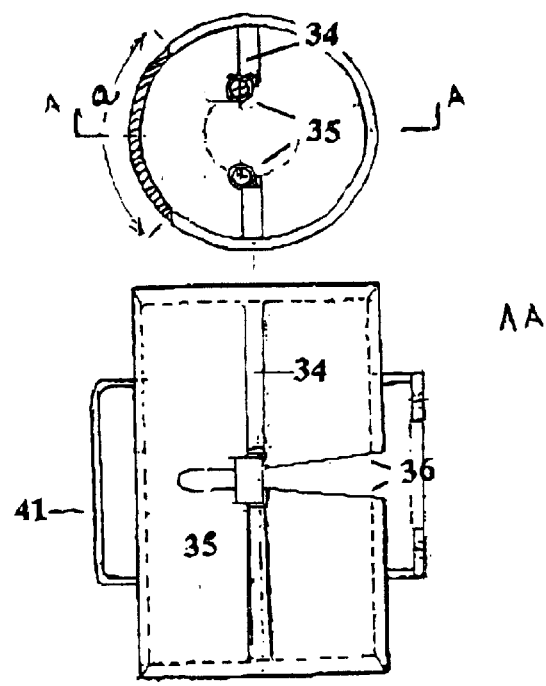
FIG. 8 shows a diagrammatical front view and a plan view from above of a positioning tower.

FIG. 8 shows a simplified view from above and a vertical cross section passing through the longitudinal axis of a positioning tower (4). As shown in the top view, the side surface of the tower has a region a, which is completely solid and strong, extending approximately over 90°. The remaining region, which is less strong, closes an opening (36), which can better be seen in the vertical cross-section, whose height varies gradually for the passage and movement of activating levers (23). Tower (4) is mounted on a type of support/bearing (41), shown only in the vertical cross-section, which enables it to rotate about its longitudinal axis.

Figure 10:
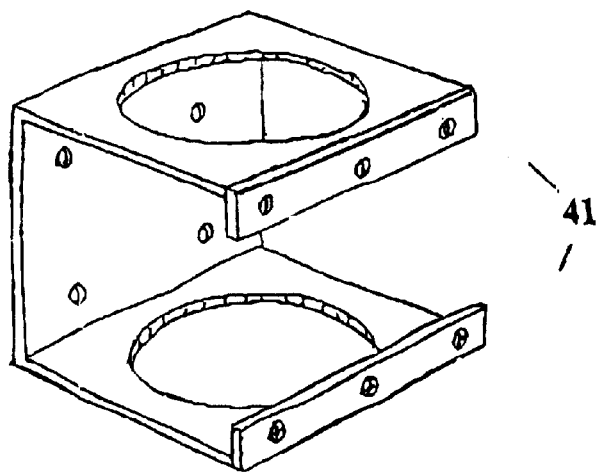
FIG. 10 shows a three-dimensional view of a support (bearing) for a positioning tower.

FIG. 10 shows a 3-dimensional view of bearing/support (41) for tower (4). This piece has a predominantly cubic shape with a hollow interior, with circular openings for the mounting for tower (4) on its upper and lower surfaces. Said support/bearing (41) has lateral skirts provided with openings for connection to support (42) of the piston systems by means of stiffening bars (45).

Figure 9:
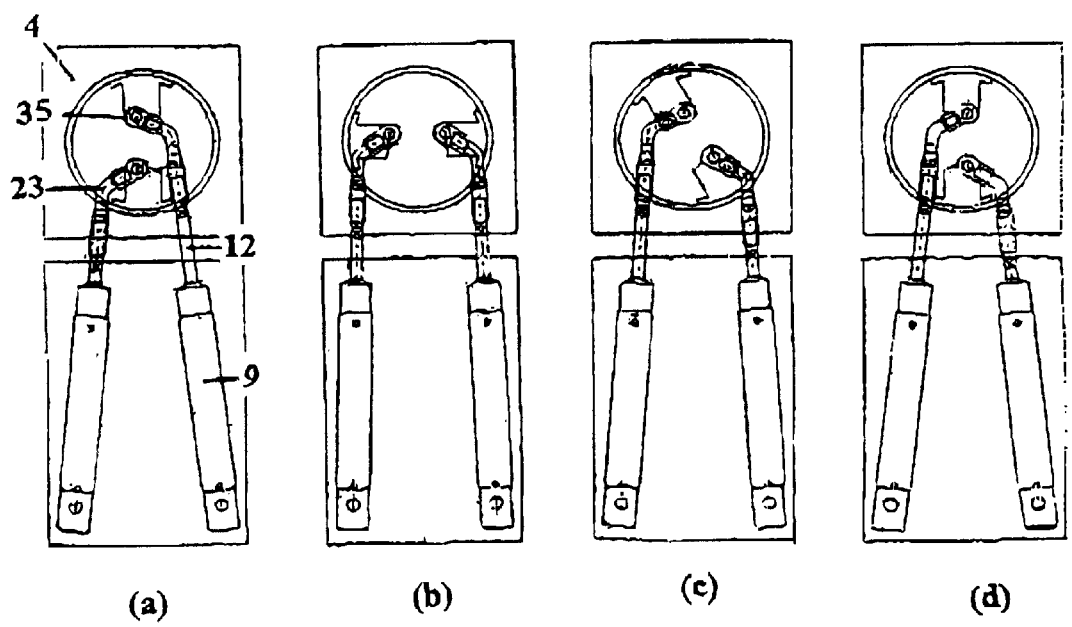
FIG. 9 shows stages in the process of the moving of a positioning tower.

FIG. 9 illustrates the rotation sequence for tower (4) for this preferred embodiment of the invention. Two suitably positioned hydraulic piston systems (9) activate in coordination corresponding levers (23) whose ends, curved through a specific angle, each have a type of fork (24) which connects them to tower (4) through a bearing (35). In this way a torque is applied to tower (4) which causes it to rotate through an angle of one hundred and eighty degrees, reversing the direction of the non-reversing means and consequently the direction of movement of equipment (1).

Figure 11:
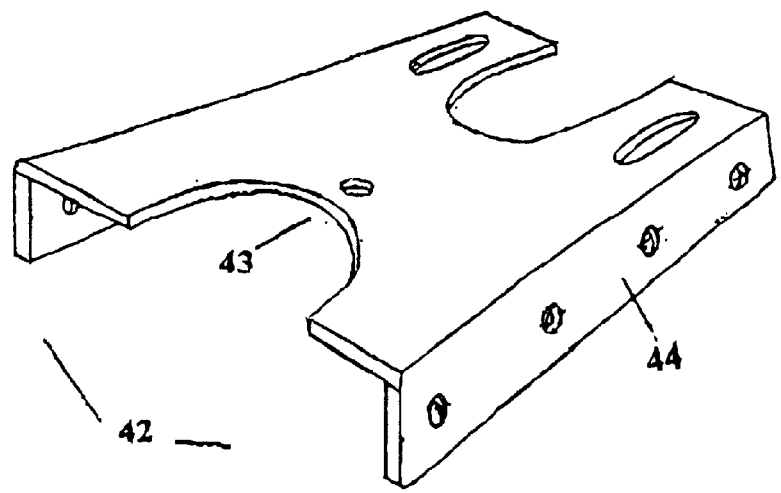
FIG. 11 shows a three-dimensional view of a support for the hydraulic cylinders.

FIG. 11 shows a three-dimensional view of support structure (42) for the piston systems. This part has the shape of an inverted U (in front view). The upper, predominantly rectangular surface has predominantly circular recesses in its free edges (base of the U) to hold connections with the fluid pipes which reach to and leave from piston system (10) moving equipment (1). On the side surfaces (limbs of the U) there are means, for example holes, for connecting this structure to support/bearing (41) for positioning tower (4) by means of stiffening bars (45).

Figure 12:
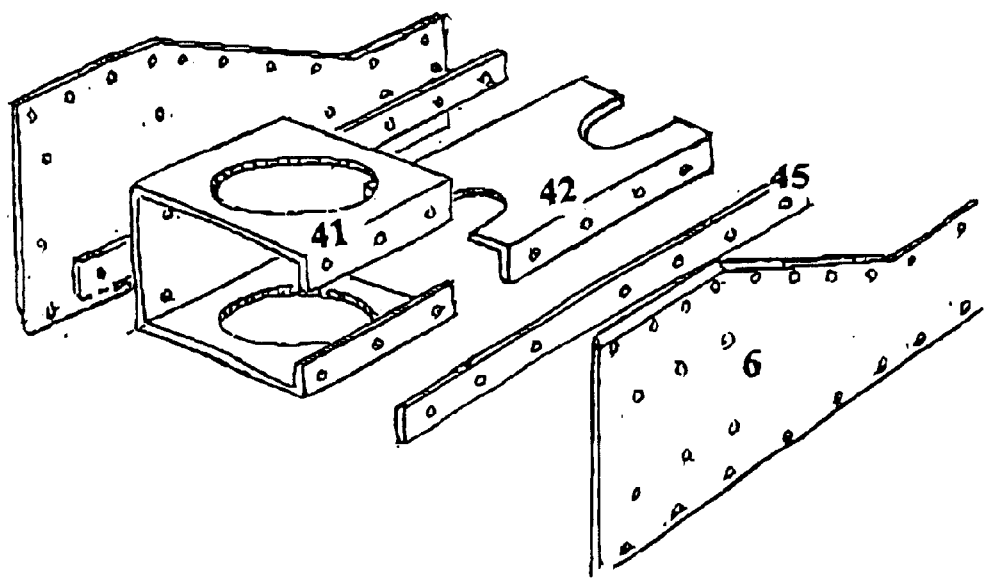
FIG. 12 shows a diagrammatical three-dimensional view of the internal supports and shells of each module, in which their corresponding relative positions may be seen.

FIG. 12 shows an exploded three-dimensional view of the assembly of parts forming the structure of the equipment in their relative positions: support/bearing (41) for positioning tower (4), support (42) for the piston systems, stiffening bars (45) and side shell (6).

Figure 13:
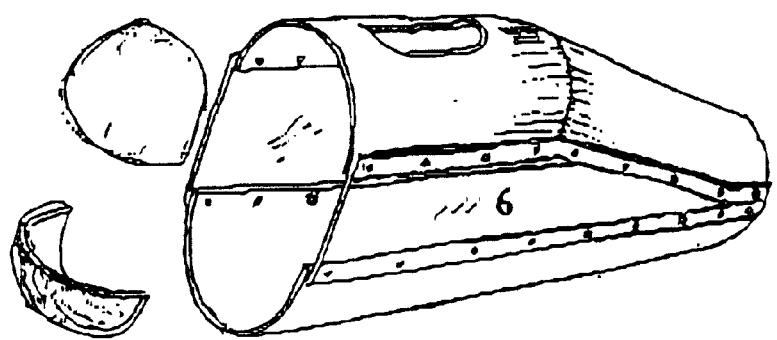
FIG. 13 shows in perspective the shell of a module of the equipment according to the invention.

FIG. 13 shows a three-dimensional view of the complete shell (6) of a module which has a predominantly tubular shape, one of the ends being tapering and the other rounded.

What is claimed is:

1. Robotic internal gauge with contact at right angles to an oil pipeline for remote-controlled operations within pipelines, wherein it comprises two identical modules of predominantly cylindrical shape connected symmetrically in line by means of a flexible joint, the said modules comprising: a) a positioning tower mounted so as to be able to rotate about its longitudinal axis, supporting wheels, provided with a non-reversing system, which bear against the internal surface of the pipeline, b) a piston system propelling a piece of equipment, c) means for changing the direction of movement of the equipment, d) means for the connection of an umbilical, and e) means for the connection of operating interfaces.

2. Robotic internal gauge with contact at right angles to the oil pipeline according to claim 1, wherein the piston systems propelling the piece of equipment are hydraulically driven.

3. Robotic internal gauge with contact at right angles to the oil pipeline according to claim 1, wherein the piston systems propelling the piece of equipment are pneumatically driven.

4. Robotic internal gauge with contact at right angles to the oil pipeline according to claim 1, wherein the propulsion for the piece of equipment is based on electrical power.

5. Robotic internal gauge with contact at right angles to the oil pipeline according to claim 1, wherein movement of the modules results from the coordinated operation of the piston systems propelling the piece of equipment, whose shafts are connected together by means of a rotating joint and the non-reversing effect present in the supporting wheels; the said non-reversing system, by permitting the movement of the modules in one direction and preventing it in the opposite direction, determines the direction of movement of the equipment.

6. Robotic internal gauge with contact at right angles to the oil pipeline according to claim 1 wherein the coordinated operation of piston systems propelling the equipment as a result of cycles comprising: a) the injection of fluid into chambers I of piston systems propelling the piece of equipment permitting the emptying of chambers II, b) after the completion of stage a), the injection of fluid into chambers II of the piston systems propelling the equipment permitting the emptying of chambers I.

7. Robotic internal gauge with contact at right angles to the oil pipeline according to claim 1, wherein the supporting wheels have a non-reversing system and are mounted on a predominantly cylindrical positioning tower, the said mounting for the wheels comprising elastic means to control the pressure of the wheels against the internal surface of the pipeline.

8. Robotic internal gauge with contact at right angles to the oil pipeline according to claim 1, wherein rotation of the positioning tower is the result of coordinated movement of the shafts of two hydraulic piston systems connected to levers in turn connected to the positioning tower, the said levers being connected to the positioning tower at different points so as to produce a rotation moment on the latter about its longitudinal axis.

9. Robotic internal gauge with contact at right angles to the oil pipeline according to claim 8, wherein the said piston systems rotating the positioning tower are pneumatically activated.

10. Robotic internal gauge with contact at right angles to the oil pipeline according to claim 1, wherein rotation of the positioning tower is brought about by means of an electrical actuator.

11. Robotic internal gauge with contact at right angles to the oil pipeline according to claim 1, wherein the change in the direction of movement of the piece of equipment is brought about by rotating the positioning towers through one hundred and eighty degrees to reverse the direction of operation of the non-reversing means for the wheels.

12. Robotic internal gauge with contact at right angles to the oil pipeline according to claim 1, wherein the rotary joint which connects the two modules is connected by a flexible extendible cap which extends between the modules; the said cap has the feature that it tends to keep the modules in line.

13. Robotic internal gauge with contact at right angles to the oil pipeline according to claim 1, wherein it is operated manually.

14. Robotic internal gauge with contact at right angles to the oil pipeline according to claim 1, wherein it is operated semi-automatically.

15. Robotic internal gauge with contact at right angles to the oil pipeline according to claim 1, wherein it is operated automatically.

16. Robotic internal gauge with contact at right angles to the oil pipeline according to claim 1, wherein it is used in pipelines having bends of small radius.

* * * * *